United States Patent Office 3,014,003
Patented Dec. 19, 1961

3,014,003
WAX COMPOSITIONS
Karekin G. Arabian, Houston, Tex., assignor to Shell
Oil Company, a corporation of Delaware
No Drawing. Filed Nov. 10, 1959, Ser. No. 851,977
3 Claims. (Cl. 260—28.5)

This invention relates to wax compositions. More particularly, it relates to novel wax compositions derived from petroleum and especially suitable for use for the coating and impregnation of food cartons and the like, especially dairy food cartons.

Petroleum waxes are broadly divided into several principal classes. Paraffin waxes are normally obtained from distillate lubricating oils but certain flexible waxes, which may be referred to generically as isoparaffin-naphthenic waxes, also may be obtained from special distillates. The components of paraffin waxes change character as their molecular weight increases, the structures becoming more complex. Hence, the components present in heavy distillates are not merely high molecular weight homologs of the predominantly normal paraffin waxes contained in lower boiling distillates. On the contrary, they appear to contain additional structures which provide them with unique properties. Microcrystalline waxes normally occur in the residual lubricating oil fractions and are characterized by their highly plastic and sticky consistency. In some crude oils, high melting point paraffin waxes occur in conjunction with microcrystalline waxes in residual lubricating oil fractions. These may be separated by fractional crystallization.

Numerous wax products have been isolated by a wide variety of procedures for specific purposes. The normal paraffin waxes melting in the range of about 120–150° F. are characterized by their highly crystalline and brittle nature. Hence, for use in many types of wax compositions they must be modified by incorporation of substantial proportions of other components if they are to be utilized in products suitable at temperatures below room temperature. While it is possible to employ substantial amounts of microcrystalline wax together with paraffin waxes for such purposes as coating of milk carton stock, this has not proved to be entirely satisfactory.

Low percentages of microcrystalline wax do not impart appreciable flexibility to paraffin waxes. High percentages impart flexibility but greatly increase the viscosity of the wax composition when it is melted. The latter becomes important during the coating operation, since most coating machines operate within very narrow ranges of tolerance with respect to wax properties.

The balancing of wax properties is not a simple matter due to the fact that the combination of one wax with another does not necessarily result in an average set of properties. The structure and melting point, as well as other properties, of each of the waxes unpredictably alters the properties of the other wax components, resulting in the formation of a wax composition having properties which cannot be calculated or predicted from the properties of the individual waxes. Thus, it becomes necessary to obtain improved food carton wax compositions by testing and not by prediction.

One of the problems involved in compounding such compositions comprises the provision of waxes having both a high degree of tensile strength and flexibility at low temperature while maintaining an adequate resistance to cracking when the composition is shock chilled. Certain waxes, such as high melting point paraffin waxes having melting points of 165–175° F. and microcrystalline waxes, may be used to increase tensile strength and/or flexibility. However, the use of more than about 1–2% of high melting paraffin waxes is undesirable since their brittle nature tends to reduce the resistance of the resulting composition to thermal shock. Microcrystalline waxes, on the other hand, have to be added in excess of 35–40% to most distillate waxes to be effective in increasing the low temperature flexibility. This is objectionable since such compositions have too high a molten viscosity and therefore tend to deposit too much wax on the cartons in certain types of coating machinery. This is not only uneconomical in wax consumption but also tends to produce such a thick wax coating that flaking of wax from the carton results at later times when the cartons are filled with food products and stored at low temperatures.

Other problems which occur in the handling and use of wax compositions comprise the "blocking" which results when slabs of wax are stock piled or wax coated articles are stored in depth. Blocking refers to the tendency of waxes to fuse together under pressure and temperature. It is widely accepted that the higher the blocking temperature of a wax is, consistent with its other necessary properties, the more desirable it is for most uses. Still another property of wax compositions which must be considered is the effect of shock chilling upon the wax surface. If the wax composition is of the type usually employed for many food carton coatings, shock chilling of the coating of wax on the carton from its originally warm condition to a substantially colder condition when the carton is filled with a product such as cold milk, for example, results in the formation of stresses which in turn cause hair-line cracks to occur. The incorporation of microcrystalline wax to improve tensile strength and flexibility will alleviate this condition if sufficient amounts of microcrystalline wax are added. However, as pointed out earlier this is objectionable for other reasons.

Resistance to shock chilling without materially increasing the melt viscosity of a wax composition can be achieved by the incorporation of certain proportions of low melting isoparaffinic-naphthenic waxes obtained from intermediate boiling distillate waxy lubricating oils. While the results constitute an advance over similar compositions containing microcrystalline wax in some respects, the wax compositions made from intermediate distillates may cause blocking to occur and may also result in too high a flow of the compositions even under cold conditions.

It is an object of the present invention to provide improved wax compositions. It is a particular object of this invention to provide improved wax compositions especially suitable for food carton coating, particularly dairy food cartons. It is a special object of the invention to provide cartons having improved low temperature properties. Other objects will become apparent during the following description of the invention.

Now, in accordance with the present invention, improved wax compositions especially suitable for dairy food cartons are provided by the combination of paraffin wax mixtures having melting points between about 122 and 145° F. with substantial amounts of heavy distillate wax mixtures having melting points between about 145 and 175° F., mixed residual microcrystalline waxes, additive proportions of a polyolefin and a substantial amount of a plastic isoparaffin-naphthenic distillate wax having a melting point between about 102 and 115° F. The latter waxes must be obtained by the use of relatively low deoiling temperatures using a solvent deoiling process wherein the temperature is between about 0° F. and −30° F. In order to be suitable for the present purpose and to have optimum properties the entire composition should have a solidification temperature above about 128° F., but, in order to promote maximum low temperature properties, the wax composition should be balanced with respect to the non-straight chain components and substantially straight chain components in such a way that the weight proportion of non-straight chain to substantially straight chain is at least 1.0.

For the purpose of convenience throughout this specification, reference will be made to "plastic" waxes by which is intended the essentially non-straight chain waxes and to "brittle" waxes by which will be meant essentially straight-chain wax species. These may be more clearly defined by a reference to a particular test method which determines whether or not a wax in question is either "plastic" or "brittle." This test is as follows: One part by weight of wax is dissolved in 6 parts of methyl isobutyl ketone. Three parts of water which has been saturated with urea at 130° F. are added. More urea corresponding to 4.5 times the weight of the wax sample is added. The mixture is then heated to a temperature of 130–150° F., preferably at about 130° F. for 30 minutes with stirring. Any wax which forms a crystalline molecular complex with urea under these conditions is classified for the present purpose as a "brittle" wax. Those waxes which do not form crystalline molecular complexes with urea under these conditions is arbitrarily termed a "plastic" wax. For the most part, the brittle waxes are normal paraffin hydrocarbons but normal hydrocarbons having no more than about 1 methyl side chain also form urea complexes. Hydrocarbons having a greater degree of cyclic structures or side chains or side chains of greater length will not form molecular urea complexes and are termed "plastic" waxes.

The limitations on the composition of this invention are dictated primarily by the machinery normally employed for dairy carton manufacture coupled with the temperature and handling conditions normally encountered in the preparation, storage and sale of dairy products. A solidification temperature of at least 128° F. is required so that the wax will congeal at a temperature sufficiently high to prevent "sloshing" thereof in the bottom of the carton during rapid directional changes of the carton in the packaging machine cooler box. Moreover a minimum proportion of plastic to brittle components is required in order to provide a composition capable of withstanding sudden thermal shock so that it will not crack when the warm carton (wax at temperatures of 90–100° F.) is filled with cold milk which has a temperature in the order of 38–45° F. In addition to these basic requirements, the carton must be resistant to formation of flakes of wax, must develop a minimum of cracks on the sides or bottom of the container when subjected to mechanical shock, and have a high tensile strength to minimize bulging of the carton and scuffing of the outer wax coating.

The weight ratio of plastic to brittle waxes, which must be at least 1 or higher, cannot be over emphasized since this is essential for the production of dairy carton waxes exhibiting good impact resistance and non-flaking characteristics. The presence of high melting paraffin waxes, which are normally obtained from the distillate fraction immediately preceding the residual fraction in the vacuum distillation of a long residue, impart good low temperature fracture resistance during cooling and raise the melting point of the final blend so that it will set up quickly in the packaging machinery. Residual microcrystalline wax is present particularly for the purpose of providing additional tensile strength to the final blend. Finally, the low temperature requirement for the deoiling of the isoparaffinic-naphthenic distillate wax is necessary for providing still further improvements particularly with respect to impact resistance and flexibility at dairy food storage temperature.

The isoparaffinic-napthenic wax is a specially prepared product. When prepared particularly from medium distillate soft wax by means of the low temperature deoiling procedure more fully described hereinafter, this product is essentially comprised of all plastic wax components and therefore will be referred to as "plastic wax." These are preferably obtained by the following procedure: A waxy lubricating oil distillate boiling within the range from about 650° F. to about 950° F. (at atmospheric pressure) is subjected to solvent dewaxing by means of known selective dewaxing solvents. Preferably, this comprises the combination of a low molecular weight aliphatic ketone and an aromatic hydrocarbon such as benzene or toluene. More specifically, a preferred pair of dewaxing solvents is methyl ethyl ketone and toluene in proportions of between about 2:1 to 1:2 by volume.

A sufficient amount of the dewaxing solvent is employed to completely dissolve the waxy lubricating oil at temperatures in excess of about 120° F., after which the solution is cooled to a dewaxing temperature, preferably in the order of between about −15 to +15° F. At this dewaxing temperature, the slack wax is filtered or centrifuged from the dewaxed oil. The slack wax is in turn subjected to a solvent deoiling procedure preferably using the same type of deoiling solvents. The slack wax is dissolved in the solvent, preferably methyl ethyl ketone mixed with toluene in 60:40 ratio, and cooled to a temperature between about 35° F. and about 50° F., at which point the refined paraffin wax is filtered. This paraffin wax is treated in accordance with known procedures, such as by repulping or washing on a filter, in order to obtain a fully refined paraffin wax having a melting point between about 135 and about 145° F.

The soft wax mixture left in solution in the solvent is in turn subjected to a deoiling treatment, either by cooling the existing solution down to a point where the plastic waxes crystallize or by removing a sufficient amount of the solvent that a more concentrated solution of the soft wax is obtained, so that more easily attained deoiling temperatures may be employed. Preferably, the soft wax is dissolved in between about 2 and about 6 parts by weight of deoiling solvent per part of soft wax, heated to a temperature in the order of 120–160° F., and cooled to a temperature between about 0 and −30° F., preferably between about −5° F. and about −20° F. at which point the plastic waxes separate and are removed by mechanical separation such as by centrifuging or filtration. In order to remove the maximum amount of contaminating oil from the precipitated waxes, it is preferred practice to subject the waxes so obtained to washing or repulping or both within the above filtration temperature range in order to obtain the desired plastic wax.

The product so obtained has unique properties not found in any wax described in the prior art. It has a melting point within the range from about 102 to about 117° F., a viscosity between about 35 and 50 SSU at 210° F., a refractive index at 70° C. between about 1.4370 and 1.4550 and an oil content as determined by the standard ASTM Method D–721 of less than about 0.5%. The penetration of the wax at 77° F. is between about 45 and 100 mm./10 by ASTM Method D 1321 54T.

The weight ratio of plastic to brittle components in any given wax varies widely with the source and previous history of the wax. Hence these factors have an important bearing upon the properties and quality of the wax and wax compositions prepared therefrom. In order to illustrate this the following Table I lists the analysis of waxes derived from various sources.

TABLE I

| Wax | Percent Plastic Wax Components | Percent Brittle Wax Com. |
| --- | --- | --- |
| Paraffin wax, 124–126° F. melting point | 0 | 100 |
| Paraffin wax, 138–140° F. melting point | 10 | 90 |
| Paraffin wax, 153–162° F. melting point | 50 | 50 |
| Residual microcrystalline wax, 145° F. softening point | 100 | 0 |
| Isoparaffinic-naphthenic waxes from soft wax | 100 | 0 |

It will be understood that the proportion of plastic to brittle waxes will vary not only with the prior history of the wax components but also with the geological and geographical source of the petroleum crudes from which the waxes are obtained.

An important ingredient used in conjunction with the other components of these novel wax compositions comprises heavy distillate wax, which has a melting point of 145–175° F., preferably 150–165° F. Such wax has a unique set of physical properties which, when combined with the other components of the composition, gives new wax compositions which have greatly improved blocking point, cold flow properties and high fracture resistance upon shock chilling. The heavy distillate waxes are preferably obtained from high viscosity lubricating oil distillate fractions having a Saybolt Universal viscosity at 210° F. of at least 65 seconds and usually between about 65 and 160 seconds. The high viscosity lubricating oil distillate is preferably dewaxed by diluting it with a dewaxing solvent such as naphtha or mixed solvents, such as methyl isobutyl ketone and toluene. The diluted waxy oil is cooled to a dewaxing temperature which is predetermined to give a wax having the following typical properties:

*Compositional Analysis* (¹)

| Component | Percent v. | Carbon No. Range | Ave. Carbon No. |
|---|---|---|---|
| n-Alkanes | 68 | $C_{22}$–$C_{45}$ | $C_{36}$ |
| Isoalkanes | 8 | $C_{20}$–$C_{45}$ | $C_{35}$ |
| Monocycloalkanes | 17 | $C_{25}$–$C_{46}$ | $C_{37}$ |
| Dicycloalkanes | 6 | $C_{29}$–$C_{46}$ | $C_{40}$ |
| Others | 1 | $C_{34}$–$C_{47}$ | $C_{38}$ |

Physical properties:
 Melting point, ASTM D-87 _____ 158.2
 Viscosity, SU at 210° F. _____ 51.4
 Color, Saybolt _____ +28
 Refractive index, $n_{90}/D$ _____ 1.4351
 Oil content, percent w., ASTM D-721 _____ 1.2
 Penetration, mm./10, ASTM D-1321—
  At 77° F. _____ 12
  At 110° F. _____ 40
 Tensile strength, p.s.i., 73° F., ASTM D-1320 _____ 186
 Blocking temperature, ° F.—
  Gradient method, pick/block _____ 123/128
Distillation Range:
 Percent v. Over— Temperature, ° F.
  IBP _____ 675
  20 _____ 860
  40 _____ 890
  60 _____ 916
  80 _____ 954

(¹) By high temperature mass spectrometer.

The major components of the subject wax compositions are paraffin waxes having melting points between about 122 and 145° F. These are obtained from lower boiling or intermediate boiling lubricating oil waxy distillates by well known dewaxing procedures. They comprise paraffin waxes which predominate largely in normal paraffins having from about 20 to about 36 carbon atoms per molecule. In the dewaxing procedures according to the processes of the art, the general practice is to distill a lubricating oil into a number of fractions, extract the aromatics and color bodies by clay percolation or by using a solvent such as phenol or the like and, finally, to dissolve the waxy lubricating oil in a solvent such as methyl ethyl ketone, methyl isobutyl ketone, acetone or mixtures thereof with other materials, such as aromatics. The aromatics which are suitable include benzene or toluene and the waxy oil solution is cooled to a predetermined level in order to cause crystallization of the wax components. The latter are removed by centrifuging or filtering and then may be purified by recrystallization, repulping or washing for the essential purpose of reducing the oil content to the lowest practical level, preferably less than about 0.2% by weight.

It is a preferred practice to utilize in the wax compositions of the invention a wax obtained from each of two different lubricating oil waxy cuts, one wax having a melting point of 122–130° F. and the other having a melting point between about 135 and about 145° F. The utilization of two different normal paraffin waxes in the subject compositions results in an improvement in tensile strength and flexibility.

Another essential component of the present compositions comprises one or more olefin polymers having molecular weights which may vary from about 1,000 to about 100,000. Ordinarily these will comprise polymers having average molecular weights of between about 2,000 and about 25,000 although the average may be as high as 50,000. Dependent upon the final use of the composition the olefin polymer may be of the synthetic rubber type, the waxy type or may be resinous or sticky solids. Typical polymers coming within the class of compounds contemplated include polyethylene and polypropylene, copolymers of ethylene and propylene and mixtures of the above homopolymers or mixtures of copolymers thereof. Consequently, the polymers contemplated preferably comprise polymers of mono- or di-olefins having monomeric units of from two to about four carbon atoms.

The polyethylenes are preferred for use in the present compositions and those employed in the preparation of wax papers may be generally described as ethylene polymer waxes which are frangible solids as distinguished from tough rubber-like polymers. Ethylene polymer waxes are obtained, for example, by pyrolysis of the rubber-like solid ethylene polymers, such as those obtained according to U.S. Patent No. 2,153,553. The methods for the preparation of ethylene polymers of either a wax-like or rubbery character are well known. Preferred materials have approximate average molecular weights between about 2,000 and 15,000, preferably about 2,500, and melt between about 200 and 250° F. They have tensile strengths in the order of 800–2,000 p.s.i. at 25° C. and ultimate elongations of 50–400% at 25° C.

While these polymers may be present in amounts up to 5.0% by weight of the composition, they are usually present in amounts of less than about 2.0% by weight of the essential three-component composition and preferably of amounts less than about 1.5%. They may be added to the wax compositions in amounts as little as 0.05% for certain purposes but usually will be present in amounts between about 0.1 and about 1.5, while optimum results are obtained for most purposes when using between about 0.5 and about 1.25 based on the total composition.

The microcrystalline waxes used in the compositions of the invention are distinguished by their amorphous or extremely small crystalline structure and comprise highly branched or naphthenic hydrocarbon waxes of high molecular weight. The term "microcrystalline wax" is understood to be substantially synonymous with other common designations, such as "amorphous wax." These waxes are obtained from residual lubricating oil fractions and preferably have melting points within the range of from about 135° F. to about 160° F., preferably 144–146° F. softening point usually possess brittle points between about —5° F. to about +30° F. and have refractive indices from about 1.4430 to about 1.4480 (sodium D line at 90° C.).

The wax compositions of this invention should have the following ratios of components in addition to meeting the dual requirements of a solidification above about 128° F. and a plastic to brittle component ratio of at least 1, preferably 1.0–2.5.

Wax component: Percent by weight
 Paraffin wax, 122–145° F. melting point__ 40–60
 Heavy distillate wax, 145–175° F. melting point _____ 5–20
 Residual microcrystalline wax _____ 10–20
 Polyolefin, 1,000–10,000 average molecular weight _____ 0.05–1.0
 Plastic isoparaffinic-naphthenic distillate wax, 102–115° F. melting point obtained by low temperature deoiling _____ 25–40

Preferred compositions having these essential five components are as follows:

| Wax component: | Percent by weight |
|---|---|
| Paraffin wax, 122–135° F. melting point | 42–50 |
| Heavy distillate wax, 150–165° F. melting point | 7.5–15 |
| Residual microcrystalline wax, 135–160° F. | 12.5–17.5 |
| Polyolefin, 1,500–4,000 average molecular weight | 0.25–0.75 |
| Low temperature deoiled plastic isoparaffinic-naphthenic wax, 106–112° F. melting point | 27–35 |

In order to demonstrate the advantages of the compositions of this invention, comparative tests were run between such compositions and other wax compositions having essentially the same components or components closely allied thereto. The compositions of these comparative examples are given in Table II together with properties, namely, impact resistance and flexibility both at 45° F. The composition according to the invention is Example C. According to Table II it will be seen that this composition has a plastic to brittle component ratio of 1.0. The effect of low temperature deoiling of the soft wax fraction will be noted particularly by comparing Example C with Example A, wherein the soft wax fraction was deoiled at +40° F. otherwise these two compositions are identical. Note especially that the plastic to brittle component ratio is the same in each case and the ratio of each of the individual wax components is the same in each sample. However, note particularly that the use of a low deoiling temperature, namely, −15° F., resulted in only 6 inches of cracks in the impact test at 45° F. as compared with double this length of crack in sample A wherein substantially higher deoiling temperatures were employed.

The advantages of the composition are still further emphasized by comparison of Example C (within this invention) with samples B and D. Here the plastic to brittle component ratio has been varied either by adjustment of the proportion of 125–126° F. melting point paraffin wax or by utilizing a higher melting point paraffin wax. It is immediately evident that the impact resistance of samples B and D, having low plastic to brittle component ratios, was poor as compared with the excellent impact resistance of sample C. The flexibility of sample D is also poor in comparison.

TABLE II

*Effect of low temperature deoiling of soft wax fraction*

| | Example | | | |
|---|---|---|---|---|
| | A | B | C | D |
| Composition, parts by weight: | | | | |
| 124–126 F R P wax | 45 | 75 | 45 | |
| 138–140 F R P wax | | | | 65 |
| 158–162 F R P wax | 10 | 10 | 10 | 10 |
| Microcrystalline wax, 145° F., M.P. | 15 | 15 | 15 | |
| Soft wax fraction, M.P., 110° F., deoiled at +40° F. | 30 | | | 25 |
| Soft wax fraction, M.P., 107° F., deoiled at −15° F. | | | 30 | |
| Polyethylene | 0.5 | | 0.5 | 0.25 |
| Plastic: Brittle Ratio | 1.0 | 0.25 | 1.0 | 0.57 |
| Properties: | | | | |
| Impact, inches of crack at 45° F. | 12 | 23 | 6 | 25 |
| Flexibility, degrees bend at 45° F. | 21 | | 25 | 8 |

One of the problems involved in the use of polymers in wax compositions is the difficulty with which dispersal is achieved. This is simplified in a wax manufacturing process wherein one or more of the components is dissolved in a solvent from which the solvent must eventually be removed. Under such circumstances, the polymer is readily dispersed in the wax solution prior to removal of solvent so as to leave the polymer homogeneously dispersed in the wax. The wax-polymer composition may then be combined with other wax or non-wax components if desired. In the present instance, the polymer is most conveniently incorporated with the solution of "plastic" wax prior to removal of solvent.

I claim as my invention:

1. A wax composition having a solidification temperature above 128° F. comprising:

| | Percent by weight |
|---|---|
| Paraffin wax, 122–145° F. melting point | 40–60 |
| Heavy distillate wax, 145–175° F. melting point | 5–20 |
| Residual microcrystalline wax | 10–20 |
| Polyolefin, 1,000–10,000 average molcular weight | 0.05–1.0 |
| Plastic isoparaffinic-naphthenic distillate wax 102–117° F., melting point | 25–40 | the last wax having been isolated from associated oil by solvent deoiling at a temperature between about 0° F. and about −30° F., said plastic wax having a viscosity of 35–50 SSU at 210° F., a refractive index at 70° C. of 1.4370–1.4550 and a penetration at 77° F. of 45–100 mm./10 as determined by ASTM Method D 132154T, the weight ratio of waxes in the composition which do not form molecular complexes with urea to waxes which form such complexes being between about 1.0 and 2.0, when the wax, urea, water and methyl isobutyl ketone are heated at 130–150° F.

2. A wax composition having a solidification temperature above 128° F. comprising:

| | Percent by weight |
|---|---|
| Paraffin wax, 122–135° F. melting point | 42–50 |
| Heavy distillate wax, 150–165° F. melting point | 7.5–15 |
| Residual microcrystalline wax | 12.5–17.5 |
| Polyolefin, 1,500–4,000 average molecular weight | 0.25–0.75 |
| Plastic isoparaffinic-naphthenic distillate wax, 106–112° F., melting point | 27–35 | the last wax having a viscosity of 35–50 SSU at 210° F., a refractive index at 70° C. of 1.4370–1.4550 and a penetration at 77° F. of 45–100 mm./10 as determined by ASTM Method D 132154T, the weight ratio of waxes in the composition which do not form molecular complexes with urea to waxes which form such complexes being between about 1.0 and 2.0, when the wax, urea, water and methyl isobutyl ketone are heated at 130–150° F.

3. A wax composition having a solidification temperature above 128° F. comprising:

| | Percent by weight |
|---|---|
| Paraffin wax, 124–126° F. melting point | 45 |
| Heavy distillate wax, 158–162° F. melting point | 10 |
| Residual microcrystalline wax, 144–146° F. softening point | 15 |
| Polyethylene, 2,500 average molecular weight | 0.5 |
| Plastic isoparaffinic-naphthenic distillate wax, about 107° F. melting point | 30 | the last wax having a viscosity of 35–50 SSU at 210° F., a refractive index at 70° C. of 1.4370–1.4550 and a penetration at 77° F. of 45–100 mm./10 as determined by ASTM Method D 13–2154T, the weight ratio of waxes in the composition which do not form molecular complexes with urea to waxes which form such complexes being between about 1.0 and 2.0, when the wax, urea, water and methyl isobutyl ketone are heated at 130–150° F.

References Cited in the file of this patent

UNITED STATES PATENTS

| 2,728,735 | Anderson | Dec. 27, 1955 |
| 2,808,382 | Jakaitis | Oct. 1, 1957 |